United States Patent [19]

Horiuchi

[11] Patent Number: 4,680,277

[45] Date of Patent: Jul. 14, 1987

[54] ALUMINA AND ALKALINE EARTH METAL OXIDE MODIFIED ZEOLITE GLASS COMPOSITION

[75] Inventor: Tetsuro Horiuchi, Gardena, Calif.

[73] Assignee: Ensci Incorporated, Chatsworth, Calif.

[21] Appl. No.: 849,585

[22] Filed: Apr. 8, 1986

Related U.S. Application Data

[63] Continuation of Ser. No. 537,254, Sep. 28, 1983, abandoned.

[51] Int. Cl.$^4$ .................. C03C 6/02; C03C 13/06; C03C 3/062; C03C 3/087
[52] U.S. Cl. ............................ 501/27; 501/35; 501/36; 501/70; 501/73
[58] Field of Search ............... 501/35, 36, 27, 70, 501/73

[56] References Cited

U.S. PATENT DOCUMENTS

| | | | |
|---|---|---|---|
| 3,687,850 | 8/1972 | Gagin | 501/35 |
| 3,736,162 | 5/1973 | Chvalovsky et al. | 501/35 |
| 3,874,886 | 4/1975 | Levecque et al. | 501/35 |
| 4,046,948 | 9/1977 | Zlochower | 501/35 |
| 4,090,882 | 5/1978 | Rauschenfels | 501/35 |

FOREIGN PATENT DOCUMENTS

| | | | |
|---|---|---|---|
| EP70772 | 1/1983 | France | 501/35 |
| 52-4519 | 1/1977 | Japan | 501/35 |
| 53-56207 | 5/1978 | Japan | 501/35 |
| 55-3367 | 1/1980 | Japan | 501/35 |
| 56-5352 | 1/1981 | Japan | 501/35 |
| 2083017 | 3/1982 | United Kingdom | 501/35 |

OTHER PUBLICATIONS

WO82/03386, 10/1982, PCT, Chough et al., 12 pages.
Breck, D. W.; "Zeolite Molecular Sieves", John Wiley & Sons, New York, pp. 441–495 (particularly 493+494).
Banab, T., et al., "Safety Evaluation of Simulated High-Level Waste Gloss Product (I) (Thermal Stability)", from INIS Atom Index 1980, ii(24) Abstract No. 571,744, Tokai Res. Establ., Japan At. Energy Res. Inst., Tokai, Japan Report 1980, JAERI-M-8706, 20 pages.

Primary Examiner—Mark L. Bell
Attorney, Agent, or Firm—Frank J. Uxa

[57] ABSTRACT

The invention relates to glasses formed from naturally occurring zeolites which are modified by inclusion of additional alumina.

17 Claims, 1 Drawing Figure

ALUMINA AND ALKALINE EARTH METAL OXIDE MODIFIED ZEOLITE GLASS COMPOSITION

This is a continuation of application Ser. No. 537,254, filed Sept. 28, 1983, now abandoned.

BACKGROUND OF THE INVENTION

1. Field:

The invention herein relates to alkaline-resistant glasses. While it pertains to glass bodies generally, it has particular pertinence to glasses which are fiberizable.

2. State of the Art:

The natural mineral zeolites are a group of hydrous alkali and/or alkaline earth aluminosilicates which have an open three-dimensional crystalline framework. While a large number of individual mineral zeolites are known and have been described in the literature, eleven (11) minerals make up the major group of mineral zeolites: analcime, chabazite, clinoptilolite, erionite, ferrierite, heulandite, laumontite, mordenite, natrolite, phillipsite and wairakite. The chemical and physical properties of these major mineral zeolites, as well as the properties of many of the minor mineral zeolites, are described extensively in Lefond (ed.), *Industrial Minerals and Rocks* (4th Ed., 1975), pp. 1235–1274; Breck, *Zeolite Molecular Sieves* (1974), especially Chapter 3; and Mumpton (ed.), *Mineralogy and Geology of Natural Zeolites*, Vol. 4 (Mineralogical Society of America: November, 1977). These publications also describe the geologic occurrence of the natural mineral zeolites and some industrial and agricultural uses which have been proposed or in which the natural mineral zeolites are now being used commercially.

It is important to note that the natural mineral zeolites are an entirely different class of materials from the "synthetic zeolites" which have been widely described in many recent articles and patents. Because there is no universally recognized system for naming the synthetic zeolites, and because some of the synthetic materials exhibit x-ray diffraction patterns which suggest possible similarities in structure with the natural mineral zeolites, some reports in the literature and patents have described certain synthetic zeolites as "synthetic" versions of the natural mineral zeolites. Thus, for instance, certain synthetic zeolites have been described as "synthetic analcime" or "synthetic mordenite" and so forth. As noted in the aforementioned Breck reference, however, this approach is technically unsound and has merely led to confusion between the two (2) otherwise distinct classes of materials: the natural mineral zeolites and synthetic zeolites. While it has been recognized that there are structural similarities between the two groups, it is clear that the natural mineral zeolites constitute a class of materials significantly separate and distinct in structure and properties from the synthetic zeolites.

Glasses are vitreous materials composed largely of silica. Because silica is a highly refractory material, however, substantial quantities of soda ash, lime or other fluxing materials are added to the silica to permit the glass-forming composition to be melted at reasonable temperatures. Small quantities of other materials, usually elemental materials or oxides, are commonly added to glass melts to provide particular properties such as color or chemical resistance to the finished glass. Heretofore, however, there has not been any report of significant usage of zeolites in glass matrices and particularly as the principal component of a glass matrix. One experiment has been reported in which a clinoptilolite and glass mixture was fired at 800° C. (well below the melting point of either) to produce what was described as a porous low density glass composition; see Mumpton, supra, p. 197, referring to Tamura Japanese published application No. 74/098,817 (1974).

Alkaline resistance is provided in some glasses by the inclusion of zirconia and/or titania, such as in AR glasses of Pilkington. Although these materials enhance the alkaline resistance of glass bodies, these are refractory materials which increase the melting point of such glasses. Also, zirconia and titania tend to add cost to the glass inasmuch as these are much more expensive materials than silica, soda, calcia and the usual components of soda lime silica glasses.

Although calcia tends to lower the melting point of the glass composition, a general admonition exists in the glass technology against using calcium oxide in quantities greater than about fifteen percent (15%) by weight of the glass body.

OBJECTS OF THE INVENTION

It is an object of the invention to produce fiberizable alkaline-resistant glasses from modified, naturally occurring zeolite materials.

Another object of the invention is to modify naturally occurring zeolite materials with readily available aluminum and alkaline earth metal compounds.

A further object of the invention is to form glass bodies from modified naturally occurring zeolites at relatively low temperatures.

SUMMARY OF THE INVENTION

Figure 1:
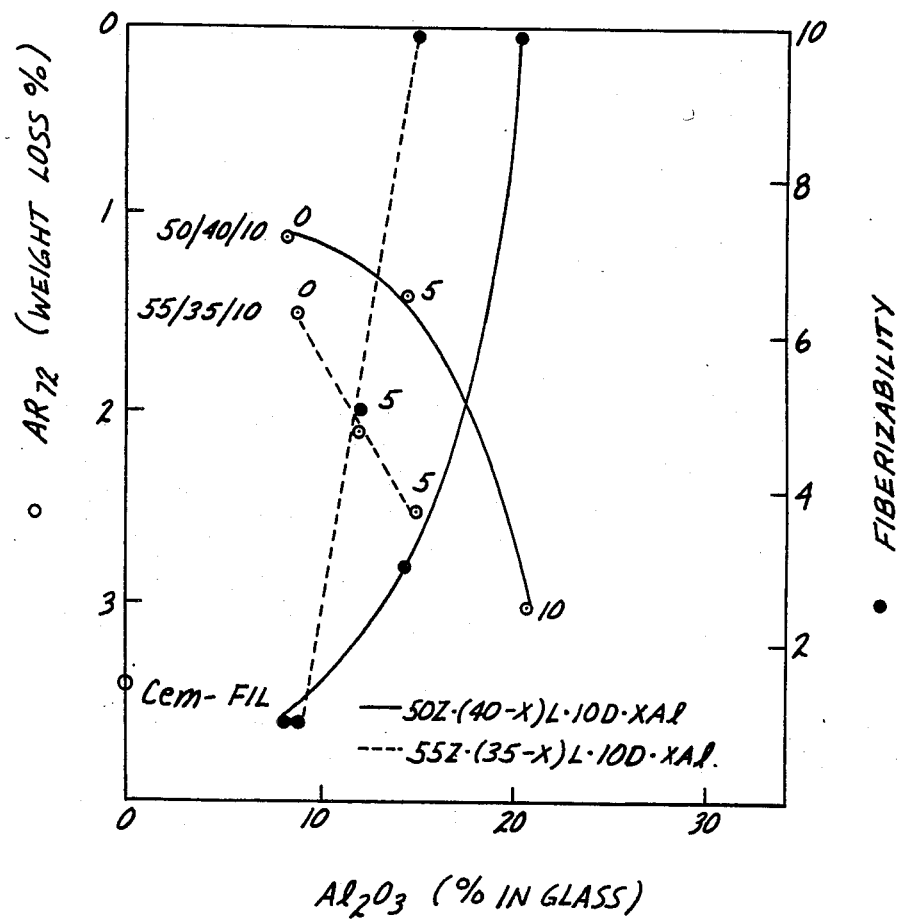
FIG. 1 is a graph of the affect of alumina upon certain properties of modified zeolite glass fibers.

The invention herein comprises glass compositions which have outstanding resistance to alkaline environments and, in particular, to glass compositions which are readily fiberizable. Such glass compositions are characterized by a high alkaline earth metal oxide content, a low silica content and a significant alumina content. In particular, these glass compositions are derived from a naturally occurring zeolite to which a compound of aluminum and alkaline earth compounds, especially calcium compounds or calcium and magnesium compounds are added to yield a low silica, moderate alumina, high alkaline earth oxide, especially calcia, glass composition. Also included within the scope of the present invention are glass bodies, particularly fibers, formed from the aforesaid glass composition.

DETAILED DESCRIPTION AND PREFERRED EMBODIMENTS

The present invention relates to fiberizable alkaline-resistant silicate glasses containing substantial quantities of alumina and optionally, although preferably, a substantial quantity of one or more alkaline earth oxides and particularly to glasses comprising silica, alumina, calcia and combinations of calcia and magnesia. A particularly useful fiberizable, alkaline-resistant glass has the following composition:

Silica - about 30% to about 60% by weight, alumina—about 10% to about 25% by weight, calcia—about 20% to about 60% by weight, magnesia—about 0% to about 30% by weight wherein the calcia plus magnesia content is from about 30% to about 60% by weight.

The invention particularly relates to glasses formed from naturally occurring zeolites and especially from glasses wherein such zeolites provided a predominance of the glass-forming components.

It is significant, as described hereinafter, that such glasses may be easily and inexpensively formed by melting an aluminum compound, e.g. alumina and a calcium compound, in the form of limestone, for example, or a calcium compound and a magnesium compound, such as found in dolomite, with a naturally occurring zeolite. Such glasses may be described as moderate alumina, calcium silicate glasses inasmuch as the calcium, in many instances, is present in about the same quantity, on a weight basis, as is the silica and the alumina is present in significant quantities.

Fiberizable alkaline-resistant glass composition may be readily formed by mixing an aluminum component and, preferably, an alkaline earth metal component such as calcium carbonate, with a naturally occurring zeolite material. Useful glass bodies, especially fibers, may be made by addition of alumina to a naturally occurring zeolite without addition of more alkaline earth metal oxide forming materials. As indicated in copending application of Clough et al, Ser. No. 360,516, filed Mar. 22, 1982, commonly assigned, many naturally occuring zeolite materials, especially those of high alumina content, may be formed into glasses, especially as fibers, under appropriate conditions. The zeolites, as a glass-forming material, have many advantages. Naturally occurring zeolites have already undergone reaction and the various elements are intimately mixed and reacted with one another. Also, the zeolite materials are particularly useful inasmuch as they have a very low sulfur content. In particular, very useful glass bodies may be formed by combining various quantities of alumina and, preferably, an alkaline earth metal component calcia or calcia and magnesia combinations with a zeolite of the following compositional range:

Silica—about 60% to about 78%, alumina—about 6% to about 30%, $Fe_2O_3$—about 1% to about 3%, calcia—about 0% to about 15%, magnesia—about 0% to about 5%, potassia—about 1% to about 2%, soda—about 1% to about 2%, with the percentage expressed being in weight percent.

In particular, it has been found that additions of minor quantities of an aluminum compound capable of forming alumina at elevated temperatures in the presence of oxygen or oxides and optionally, although preferably, from 40% to about 70% by weight, and in particular from about 40% to about 60% by weight of an alkaline earth metal compound, especially calcium carbonate mixed with a zeolite, results, after melting of the finely ground material, in a glass having excellent resistance to an alkaline environment and excellent fiberizability with an extended working range. Furthermore, these glasses advantageously melt at temperatures from about 1400° C. to about 1500° C. Also, glasses formed by mixing such alumina modified zeolite materials with similar weight percentages of dolomite, i.e. about 40% to 70% by weight of dolomite, result in glasses having comparable properties to those formed by addition of calcium carbonate. Although carbonates are preferred reactants, other salts or compounds of alkaline earth metals, especially calcium and magnesium, could be utilized.

Suitable aluminum compounds for addition to the zeolite include alumina, various clays having a high alumina content such as kaolin, montmorillonite and the like, and aluminum compounds such as aluminum chloride, aluminum sulfate and the like.

A glass-forming composition may be readily formed by mixing finely ground limestone with a finely ground zeolite material, such as the composition identified above, and a finely ground alumina-forming material. The alumina-forming material and zeolite material, inasmuch as it is a pre-reacted crystalline material, primarily of calcium aluminum silicates, react readily and efficiently with the calcium carbonate of the limestone to form a glass composition having a significant alumina and calcia content. Calcia loadings in the glass-forming composition of about 40% to 50% calcium carbonate tend to provide slightly lower melting points than loadings involving 60% to 70% by weight calcium carbonate, based upon a weight of 100% equalling the total weight of the zeolite and calcium carbonate.

The glass material, upon cooling, exhibits good physical properties, having strengths and other qualities substantially equivalent to a typical soda-lime silicate glass and having resistance to alkaline solutions from about ten-fold to twenty-fold better than a typical soda-lime silicate window glass. Also, the resistance to alkaline materials tends to increase as the calcia content increases from about 40% to about 50% by weight of calcium carbonate in the mix and then tends to decrease slightly with loadings of 70% calcium carbonate contributing less resistance to dilute caustic soda than a glass with 40% loading. Further, the higher alumina content of these alumina modified zeolite glasses improves fiberizability, extended working temperature range and strength.

Besides improving fiberizability and durability of the glass in alkaline environments, zeolite-type glasses containing increased alumina and high calcia and/or magnesia loadings have other advantages as well. The addition of alumina-forming materials and calcium and/or magnesium compounds tends to even out variances in the zeolite composition. Zeolites are naturally occurring materials and are not homogenous or uniform in their composition. Naturally occurring zeolites contain various quantities of alumina and calcia. The alumina content may vary significantly depending upon the mineral type. A few mineral zeolites contain alumina in sufficient quantities to form readily fiberizable glasses. However, most zeolite materials contain low amounts of alumina in differing quantities. Thus, addition of alumina to such zeolites provides a glass-forming composition of substantially uniform composition from batch to batch which has good fiberizability and, through addition of alkaline earth metal components, good alkaline resistance.

Although smaller or larger quantities of zeolite material may be utilized, good results are achieved from a glass-forming composition which has about 35% by weight, or more, of a naturally occurring zeolite. Improved fiberizability is achieved from glass-forming compositions having about 40% or more zeolites unless additional silica, alumina, etc. of the same ratios as exist in the zeolite are included in the batch. Excellent results have been achieved with zeolite compositions of about 50% or more.

Such naturally occurring zeolites may contain high quantities of alumina, but typically contain up to about 10% by weight. Thus, alumina-forming materials are added in quantities of about 0.1% by weight to about 20% by weight, and preferably from about 2% to about 15% by weight, calculated as alumina to the zeolite materials to obtain glasses with improved fiberizability.

As indicated elsewhere herein, alkaline earth metal components are also preferably added to alumina modified zeolite glass-forming compositions. It is, of course, within the scope of the invention to add quantities of silica to achieve uniform batch compositions or to achieve particular silica to alumina ratios. Usually such silica additions are unnecessary but may be made if desired. Additions of soda, potassia and the like may also be made, but since low soda and potassia contents are desired, such additions are usually not practiced.

The zeolites contain relatively substantial quantities of water, that is, hydrated materials. Hydrated crystalline materials generally tend to melt at a lower temperature. Thus, there are further advantages to beginning the glass-forming operation with a pre-reacted zeolite, rather than initiating it with silica.

The melting temperatures of the alumina-modified alkaline earth metal aluminum silicate glasses of this invention come within a range, i.e. about 1400° C. to about 1500° C., which permits the drawing of glass fibers through platinum dies. The glass fibers could also be formed by spinning or other techniques. However, formation of continuous strands is best accomplished by drawing through an orifice in a platinum or platinum-rhodium body. These alumina modified glasses have excellent fiberizability, including resistance to crystallization thereby permitting fibers to be drawn over a wider temperature range.

Fibers of the glass compositions of this invention are particularly useful inasmuch as they may be used to strengthen bodies which are highly alkaline in nature, for example, cement and plaster. Such fibers may also be used to strengthen organic matrices of various types. Reinforcement of cement with such fibers, however, provides a particularly advantageous use inasmuch as asbestos has been frequently used heretofore for that purpose. Because of various health and/or environmental concerns, the use of asbestos is diminishing. Continuous strands or mats of glass fibers having the glass compositions described herein effectively reinforce concrete bodies.

EXAMPLE I

Naturally occurring zeolites were finely comminuted, admixed with particulate alumina, calcium carbonate, magnesium carbonate, limestone or dolomite, as indicated, and melted to form glass bodies and fibers. The melting was conducted batch-wize in small crucibles at temperatures of about 1350° C. to about 1500° C. depending upon zeolite composition and quantity of alumina and alkaline earth metal material added.

TABLE I

Compositions And Properties of Zeolite Glasses

|  | Type Ia | Type Ib | Type IIa | Type IIb | Type IIc |
|---|---|---|---|---|---|
| Batch Composition (wt %) | 50 Zeolite 40 $CaCO_3$ 10 $MgCO_3$ | 50 Zeolite 40 $CaCO_3$ 5 $MgCO_3$ 5 $Al_3O_3$ | 50 Zeolite 40 Limestone 10 Dolomite | 50 Zeolite 35 Limestone 10 Dolomite 5 Alumina | 50 Zeolite 30 Limestone 10 Dolomite 10 $Al_2O_3$ |
| $SiO_2$ | 48.2 | 46.6 | 47.9 | 46.5 | 45.2 |
| $Al_2O_3$ | 8.3 | 14.6 | 8.3 | 14.6 | 20.6 |
| $Fe_2O_3$ | 0.5 | 0.5 | 0.5 | 0.5 | 0.5 |
| CaO | 31.1 | 30.0 | 35.0 | 30.4 | 25.9 |
| MgO | 6.8 | 3.4 | 3.2 | 3.1 | 3.0 |
| $K_2O$ | 2.7 | 2.6 | 2.7 | 2.6 | 2.5 |
| $Na_2O$ | 2.5 | 2.4 | 2.4 | 2.4 | 2.3 |
| T (°C.) $10^3$ poise | 1400 | 1400 | 1350 | 1400 | 1400 |
| Alkali resistance 5% NaOH (wt loss %) | 0.9 | 0.9 | 1.1 | 1.4 | 3.0 |
| Fiberizability | poor | fair | poor | fair | good |
| Working Range (°C.) | 10 | 30 | 10 | 30 | 80 |

TABLE II

Compositions And Properties Of Zeolite Glasses

|  | Type IIIa | Type IIIb | Type IIIc |
|---|---|---|---|
| Batch Composition (wt %) | 55 Zeolite 35 Limestone 10 Dolomite | 55 Zeolite 32.5 Limestone 10 Dolomite 2.5 Alumina | 55 Zeolite 30 Limestone 10 Dolomite 5 Alumina |
| $SiO_2$ | 51.5 | 50.7 | 50 |
| $Al_2O_3$ | 8.9 | 12.0 | 15 |
| $Fe_2O_3$ | 0.6 | 0.6 | 0.5 |
| CaO | 30.6 | 28.3 | 26.1 |
| MgO | 3.1 | 3.1 | 3.0 |
| $K_2O$ | 2.9 | 2.8 | 2.8 |
| $Na_2O$ | 2.6 | 2.6 | 2.5 |
| T (°C.) $10^3$ poise | 1400 | 1450 | 1450 |
| Alkali resistance 5% NaOH (wt loss %) | 1.5 | 2.1 | 2.6 |
| Fiberizability | poor | good | very good |
| Working range (°C.) | 10 | 50 | 100 |

In Table I, glasses Type Ia and IIa exhibit good resistance to alkali attack, but exhibit poor fiberizability and have a limited working temperature range. Glasses Ib, IIb and IIc, in contrast, have improved fiberizability and working range while maintaining good resistance to alkali attack.

Glass IIIb and IIIc of Table II exhibited progressively improving fiberizing and working properties. While some diminishment of alkali resistance was experienced with glass IIIb and IIIc, the alkali resistance is still very good. The alkaline earth metal content of glass IIIb and IIIc was slightly lower than the glass IIIa in contrast to the alumina content which was significantly greater than in glass IIIa.

The effect of alumina on fiberizability and alkali resistance of a glass formed from naturally occurring zeolite is illustrated in FIG. 1. Glasses with both 50% and 55% zeolite material exhibited significant improvement in fiberizability from alumina additions. Additions to both zeolite compositions, i.e., 50% and 55%, of from about 2% to about 10% by weight of alumina significantly improved fiberizability while a satisfactory alkaline resistance is maintained.

A particularly effective alumina range in the glass body is in the range of about 12% to 25% by weight with a preferred range of about 15% to about 21% by weight with best results being achieved from compositions having a minimum of about 18% by weight alumina. Additions of alumina from about 2% to about 15% by weight to alkaline earth metal modified zeolite compositions enables the molten glass to be readily drawn without undue crystal formation. Crystal formation is altered from $CaO-SiO_2$ to $CaO-Al_2O_3-2SiO_2$. Without addition of alumina, crystallization begins at about 1000° C. to about 1100° C. Alumina additions may also increase melt viscosity which often suppresses crystallization and phase separation.

The outstanding tolerance to alkaline environments render these glasses, especially in fiber form, as excellent reinforcement materials for concrete, plaster and other inorganic matrices of an alkaline nature. This is especially significant inasmuch as asbestos, which has been a standard extender as reinforcement material in cement and concrete bodies, is considered undesirable because of the health hazard it may present.

The glasses of this invention have excellent resistance to moisture degradation and do not degrade or deteriorate during normal or extended storage periods.

The low sulfate content of naturally occurring zeolites is important in their utilization as ingredients in glass-forming processes. Sulfates tend to degrade during glass melting conditions, yielding sulfur dioxide and other objectionable sulfur compounds. Environmental concerns militate against use in glass-making processes of any raw material containing sulfates, sulfites and other sulfur compounds.

Although embodiments of the instant invention has been described as having significant loadings of calcia, it is to be recognized that at least minor substitutions of other alkaline earth metal oxides in lieu of calcia may be made. For example, magnesium compounds, particularly magnesium carbonate may be substituted for at least some of the calcium carbonate in preparing a batch for melting into an alkaline-resistant glass. Similarly, barium and strontium compounds may be substituted as well as beryllium compounds, many of which are naturally occurring materials found in the same geographic regions as zeolites.

A particularly useful fiber-glass composition in weight percent has about 45% to 52% $SiO_2$, 15% to 21% $Al_2O_3$, 28% to 35% alkaline earth metal oxide, preferably calcia and magnesia in a predominance of calcia, and 4% to 6% alkali metal oxide, preferably soda and potassia. A predominance of the silica is preferably provided by a naturally occurring zeolite to which additional alumina and alkaline earth metal oxide have been added.

The oxides of alkaline earth metal elements are not considered glass formers, which is a term applied to elements having a valence greater than three, e.g. silicon, boron, and phosphorous, which may form three-dimensional networks with their oxides, namely, silica, boric oxide, and various oxides of phosphorous. Alkaline earth metal elements, being divalent, are more tightly bound in a glass than are alkali metal elements.

Sources of alkaline earth metals to form oxides in the glasses of this invention are as follows:

| Alkaline Earth Metal Compound | Source |
| --- | --- |
| Calcium Carbonate | Limestone |
| | Marble |
| | Chalk |
| Magnesium Carbonate | Dolomite |
| Magnesium Silicate | Serpentine |
| Barium Carbonate | Wetherite |
| Strontium Carbonate | Strontianite |
| Beryllium Aluminum Silicate | Beryl |

Sources of calcium and magnesium carbonates are generally more plentiful and cheaper than sources of barium, strontium or beryllium compounds. Also, beryllium metal is considered toxic, although beryllium oxides bound within a glass body are not hazardous.

It is noteworthy that the zeolite-derived glasses of this invention have good working properties and strength in addition to outstanding alkaline resistance. These glasses may be used in any form, e.g. containers, sheets, fibers and the like, and especially for any use in which transparency or colorlessness are not required. The glasses may be used as flakes, bubbles (microspheres), fibers and the like to reinforce organic or inorganic matrices, especially cement, plaster and the like.

The increased alumina content of the modified zeolite glasses of this invention provides a glass which may be easily fiberized and which has excellent strength.

What is claimed is:

1. A glass-forming composition comprising: naturally occurring pre-reacted zeolite and at least one added aluminum component separate from said zeolite in an amount sufficient to improve the fiberizability of the glass body formed from said composition, provided that said glass body contains about 30% to about 60% by weight of silica and about 2% to about 20% by weight of alumina.

2. The composition of claim 1 wherein said added aluminum component is present in said composition as alumina.

3. The composition of claim 1 wherein said glass composition contains about 0.1% to about 15% by weight of said added aluminum component, calculated as alumina.

4. The composition of claim 3 wherein said glass composition contains at least about 35% by weight of said zeolite.

5. the composition of claim 1 wherein the glass body formed from said glass-forming composition includes about 25% to about 60% by weight of calcia and about 0% to about 30% by weight of magnesia.

6. The composition of claim 5 wherein said glass composition contains at least about 35% by weight of said zeolite.

7. The composition of claim 5 wherein said glass composition contains zeolite and an additional alkaline earth metal component.

8. The composition of claim 6 wherein said glass composition contains zeolite and an additional alkaline earth metal component.

9. The composition of claim 6 wherein said glass composition contains about 40% to about 70% by weight of said zeolite.

10. The composition of claim 9 wherein said alkaline earth metal component is at least one of limestone or dolomite.

11. The composition of claim 1 wherein a predominant amount of the silica and a significant amount of the alumina in the glass body originates from a naturally occurring zeolite in the glass-forming composition.

12. The composition of claim 11 wherein a significant quantity of an alumina-forming component is present in addition to the zeolite in the glass-forming composition.

13. The composition of claim 1 wherein said glass body includes alkali metal oxide which originates predominantly from said naturally occurring zeolite.

14. A glass-forming composition comprising:
naturally occurring pre-reacted zeolite and at least one added aluminum component separate from said zeolite in an amount sufficient to improve the fiberizabilty of the glass body formed from said composition, provided that said glass body contains about 30% to about 60% by weight of silica and about 12% to about 25% by weight of alumina.

15. A glass-forming composition comprising:
naturally occurring pre-reacted zeolite and at least one added aluminum component separate from said zeolite in an amount sufficient to improve the fiberizability of the glass body formed from said composition, provided that said glass body contains about 30% to about 60% by weight of silica and about 15% to about 21% by weight of alumina.

16. The composition of claim 14 wherein said glass-forming composition contains at least about 35% by weight of said zeolite and said glass body includes about 25% to about 60% by weight of calcia and about 0% to about 30% by weight of magnesia.

17. The composition of claim 15 wherein said glass body comprises:
$SiO_2$—about 45% to about 52% by weight
$Al_2O_3$—about 15% to about 21% by weight
Alkaline earth metal oxide—about 28% to about 35% by weight
Alkali metal oxide—about 4 to about 6% by weight.

* * * * *